United States Patent
Shih et al.

(10) Patent No.: US 7,061,281 B2
(45) Date of Patent: Jun. 13, 2006

(54) METHODS AND DEVICES FOR OBTAINING SAMPLING CLOCKS

(75) Inventors: Yang-Hung Shih, Hsinchu (TW); Ying-Chieh Tu, Changhua Hsien (TW)

(73) Assignee: Mediatek Inc., Hsinchu (TW)

( * ) Notice: Subject to any disclaimer, the term of this patent is extended or adjusted under 35 U.S.C. 154(b) by 0 days.

(21) Appl. No.: 10/868,338

(22) Filed: Jun. 15, 2004

(65) Prior Publication Data

US 2005/0275436 A1 Dec. 15, 2005

(51) Int. Cl.
  *G09G 5/00* (2006.01)
  *G11C 27/02* (2006.01)
(52) U.S. Cl. .......................................... 327/91; 345/213
(58) Field of Classification Search ................. 345/213, 345/3, 132, 204; 348/537, 571; 341/122; 327/91, 94
See application file for complete search history.

(56) References Cited

U.S. PATENT DOCUMENTS

| | | | | |
|---|---|---|---|---|
| 6,115,075 | A * | 9/2000 | Yoneno | 348/537 |
| 6,268,848 | B1 | 7/2001 | Eglit | 345/213 |
| 6,430,240 | B1 * | 8/2002 | Eglit | 375/355 |
| 6,633,288 | B1 | 10/2003 | Agarwal et al. | 345/213 |
| 2003/0156107 | A1 | 8/2003 | Sakashita | 345/213 |
| 2003/0185332 | A1 | 10/2003 | Cheng | 375/376 |

FOREIGN PATENT DOCUMENTS

WO    WO0101386    1/2001

* cited by examiner

*Primary Examiner*—My-Trang Nu Ton
(74) *Attorney, Agent, or Firm*—Thomas, Kayden, Horstemeyer & Risley

(57) ABSTRACT

Methods for obtaining a sampling phase to generate image information according to an analog image signal and timing information are performed. In an exemplary method, sampling clocks having a predetermined phase difference therebetween is sequentially generated according to timing information. The analog image signal is sampled using the sampling clocks, and sequential sampled values corresponding to each sampling clock are generated. The sampled values are detected to obtain edges formed by the sampled values. Magnitudes of the edges are accumulated to generate accumulation values. An optimum sampling clock is obtained according to the accumulation values. The optimum sampling clock corresponding to the accumulation value is the largest one among the accumulation values corresponding to the adjacent sampling clocks, and the difference among the accumulation values corresponding to the adjacent sampling clocks is within a predetermined range. The analog image signal is sampled using the sampling clock corresponding to the selected accumulation value.

38 Claims, 6 Drawing Sheets

METHODS AND DEVICES FOR OBTAINING SAMPLING CLOCKS

BACKGROUND

The present invention relates in general to signal processing for computer graphics.

Digital image processing is typically regarded as the most popular method used in display systems. However, one perceived drawback of digital signal processing is the use of high bit counts when digital signals are transmitted between different systems. In addition, a great deal of bandwidth and processing power are required for data transfer. Therefore, the use of analog signals is oftentimes regarded as the prime solution in the application of data transmission between different system interfaces. For example, eight data lines are required for the transmission of an 8-bit digital pixel signal of 256 colors, while one data line provided for the transmission of analog signal is sufficient. Thus, an analog video signal is received by the digital display. The digital display usually samples the analog video signal using a predetermined clock to generate discrete samples. The discrete samples can be used to determine pixel values which may be used to display images on the digital display.

FIG. 1 shows a conventional computer display system. Standard video interface between the PC part 10 and the display part 12 comprises three video signals R/G/B as well as horizontal synchronization signal HSYNC and vertical synchronization signal VSYNC. In the PC part 10, digital pixel data is generated by a graphics circuit 102 and converted by the digital-to-analog converter (DAC) 104 into the associated analog video signals. The analog video signals R/G/B are transmitted, through a cable 14, to the analog-to-digital converter (ADC) 122 of display part 12, which could be a digital display device. The ADC 122 receives the analog video signals and converts them into corresponding digital video signals for image display according to the sampling clock provided by timing generator 124. In other words, the ADC 122 is used to generate the digital video samples corresponding to the digital video data in PC part 10. Then the digital video samples are transmitted to video processing block 126 for further video processing. The quality of the image to be displayed on the display part 12 heavily relies upon whether the analog video signals are sampled by a sampling clock with a correct phase.

FIG. 2 shows amplitude versus time response of a single pixel of an analog video signal for the digital display 12. FIG. 2 also shows two groups 20A and 20B of the sampling points generated by sampling the analog video signal respectively using two sampling clocks with the same sampling period 22 but different phases.

Here, accurate samples are obtained at the sampling points denoted by the arrows in group 20A, since the analog video signal is transient at the sampling points denoted by the dotted arrows in group 20B. Thus, it is important to obtain an accurate sampling timing.

Recently, there were several patents declared to control ADC sampling phase. U.S. Pat. No. 6,268,848 to Eglit discloses a method and apparatus implemented in an automatic sampling phase control system for digital monitors which adjusts the phase of an analog video signal sampling system clock depending upon numerical characteristics of the values of digital samples.

Eglit discloses a method for sampling a plurality of lines of the analog video signal at points in time determined by the delayed sampling clock, detecting peaks and valleys of a signal representing the digital signal digital samples, generating a numerical value based upon relative values of magnitudes of the peaks and valleys, and adjusting the delay of the sampling clock to maximize the numerical value. The numerical value based upon relative values of magnitudes of the peaks and valleys in Eglit is generated by summing the relative value of the magnitudes of the peaks and valleys of the analog video signal.

FIG. 3 shows an example of the relationship between the numerical values and the corresponding sampling phases. Assuming a sampling clock period is divided into 32 phase differences, the digital video signal is sampled using 32 sampling clocks with the phase difference therebetween, and 32 numerical values are generated, with each corresponding to a different sampling phase. In FIG. 3, the abscissa represents the number of the sampling clocks, for example, 1 represents a first sampling clock, and 2 represents a second sampling clock delayed by one phase difference from the first sampling clock. In addition, the ordinate represents numerical values corresponding the sampling clocks in FIG. 2.

The method disclosed in Eglit adjusts the delay of the sampling clock to maximize the numerical value, and uses the adjusted sampling clock as an optimum sampling clock. In FIG. 3, the maximum numerical value is obtained by sampling the analog video signal using the $10^{th}$ sampling clock. However, the numerical values corresponding to the $9^{th}$ and the $11^{th}$ sampling clocks are abruptly decreased. Thus, the maximum numerical value is possibly caused by noise or error detection. This is because in ordinary cases the difference among the accumulation values should not change a lot while there is only slight phase difference among the $9^{th}$, the $10^{th}$ and the $11^{th}$ sampling clocks. Therefore, the accuracy of the sampled result may deteriorate when the sampling clock corresponding to the maximum numerical value in Eglit is used.

SUMMARY

Methods and devices for obtaining sampling clocks are provided. In this regard, an embodiment of a method for obtaining a sampling phase to generate image information according to an analog image signal and timing information comprises: A plurality of sampling clocks having a predetermined phase difference therebetween are sequentially generated according to timing information. The analog image signal is sampled using the sampling clocks, and sequential sampled values corresponding to each sampling clock are generated. The sampled values are detected to obtain edges formed by the sampled values. Magnitudes of the edges are accumulated to generate accumulation values. An optimum sampling clock is obtained according to the accumulation values. The accumulation value corresponding to the optimum sampling clock is the largest one among the accumulation values corresponding to the adjacent sampling clocks, and the difference among the accumulation values corresponding to the adjacent sampling clocks is within a predetermined range. The analog image signal is sampled using the sampling clock corresponding to the selected accumulation value.

In addition, an embodiment of a device for obtaining a sampling phase to generate image information according to an analog image signal and timing information comprises: A sampling clock generator sequentially generates sampling clocks having a predetermined phase difference therebetween according to the timing information, and selects one of the sampling clocks to be an optimum sampling clock according to a pulse selection signal. An analog-to-digital converter samples the analog image signal using the sampling clocks and the optimum sampling clock, and generates sequential sampled values and the image information respectively corresponding to each sampling clock and the optimum sampling clock. The sampled values comprises a plurality of sampling groups, each sampling group comprising a first sampled level, a second sampled level and a third sampled level in sequence. A processor coupled between the analog-to-digital converter and the sampling clock generator, implements the steps of detecting the sampled values, accumulating the differences between the first sampled level and the second sampled level of the sampling groups belonging to one sampling clock to obtain a accumulation value when the difference between the first sampled level and the second sampled level exceeds a first reference value and the difference between the second sampled level and the third sampled level is less than a second reference value, and/or accumulating the differences between the second sampled level and the third sampled level of the sampling groups belonging to the sampling clock to obtain the accumulation value when the difference between the second sampled level and the third sampled level exceeds the first reference value and the difference between the first sampled level and the second sampled level is less than the second reference value, obtaining the accumulation values corresponding to each sampling clock, the accumulation values arranged in the sequence of the corresponding sampling clocks, comprising collectively an accumulation value group, detecting the accumulation values, selecting the largest in the accumulation value group when the difference between the accumulation values in the accumulation value group is less than a predetermined range, and outputting the pulse selection signal denoting using the sampling clock corresponding to the selected accumulation value as the optimum sampling clock.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION

Figure 1:
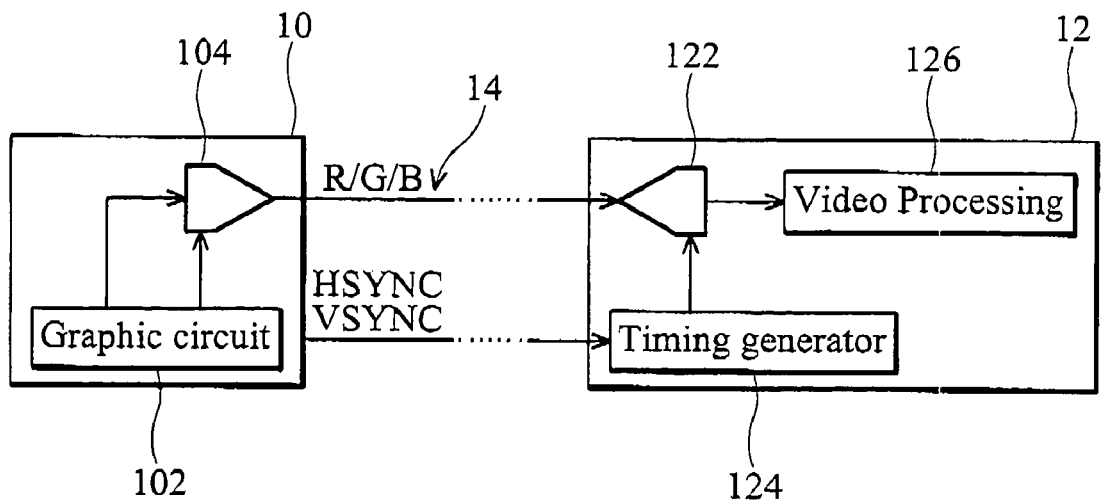
FIG. 1 shows a conventional computer display system.
Figure 2:
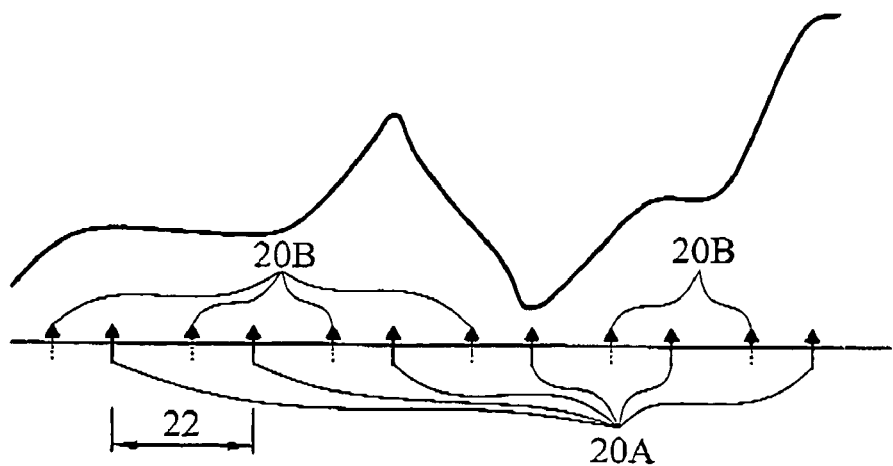
FIG. 2 shows amplitude versus time response of a single pixel of an analog video signal for a display part 12.
Figure 3:
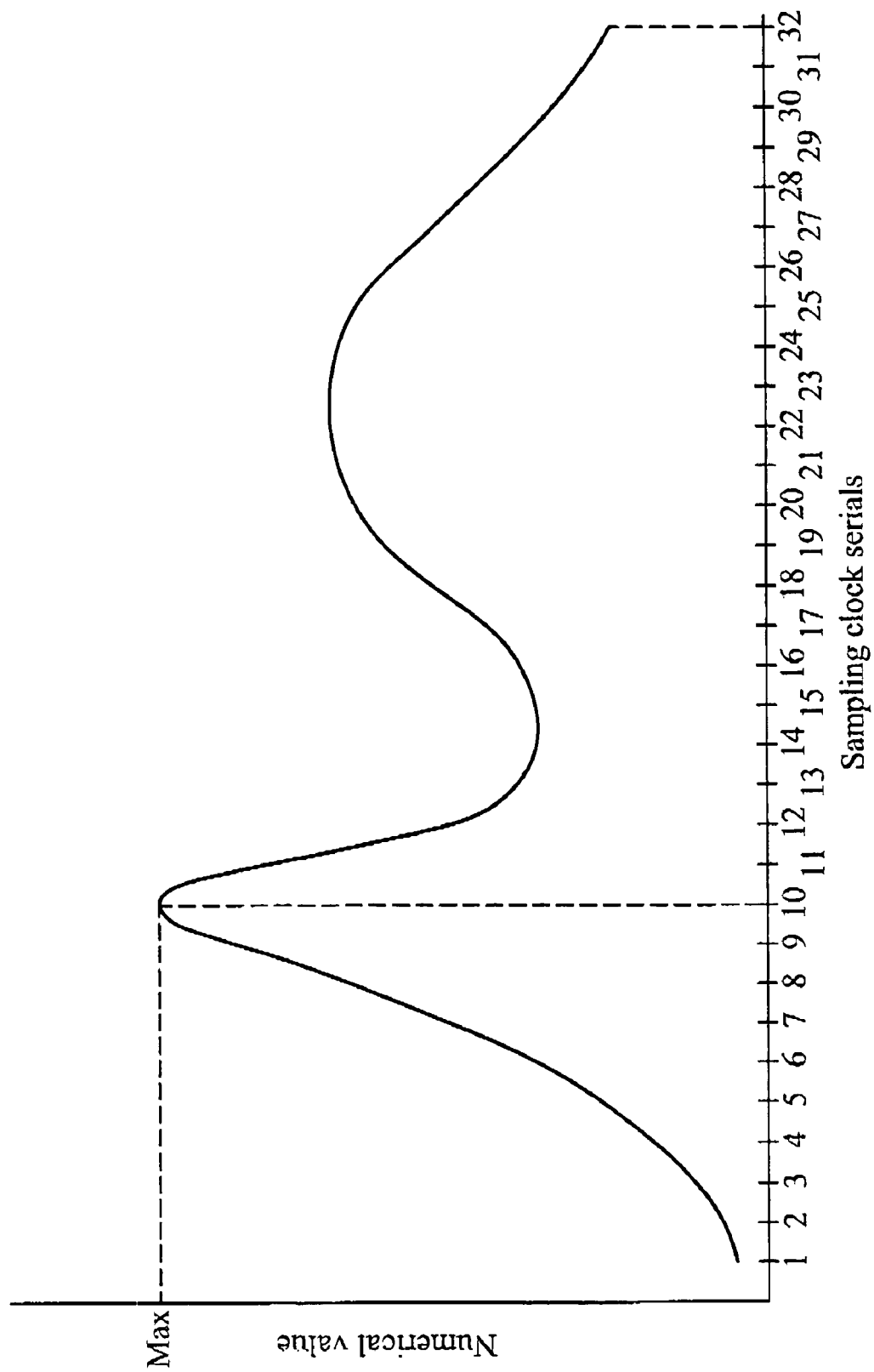
FIG. 3 shows the relationship between the numerical values and the corresponding sampling phases.
Figure 4:
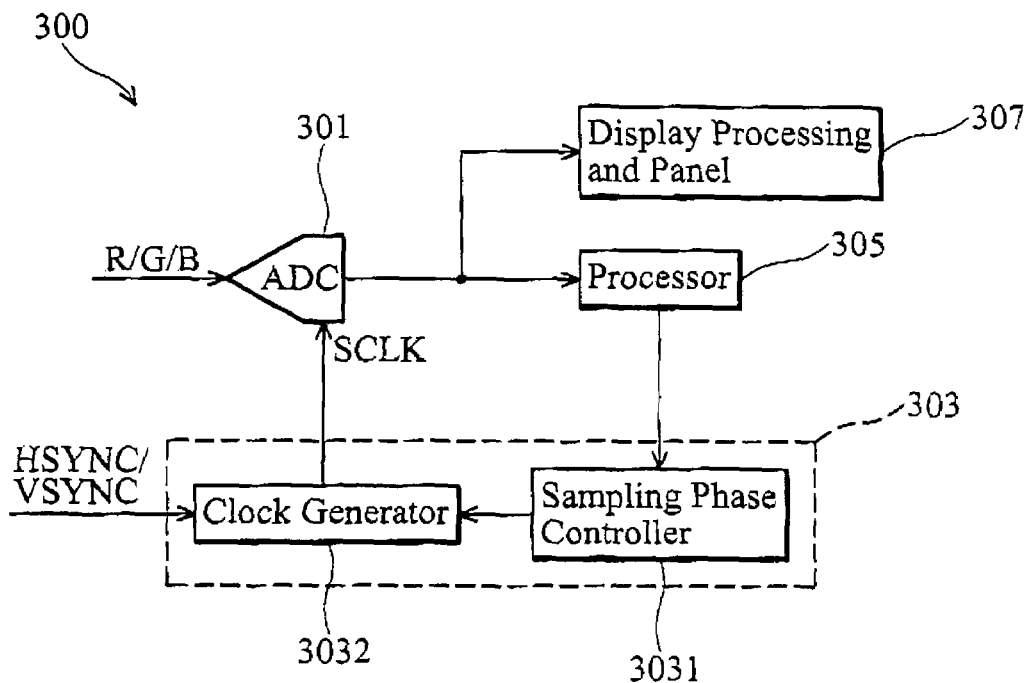
FIG. 4 shows a block diagram of an embodiment of a device for obtaining an optimum sampling clock.

FIG. 4 shows a block diagram of an embodiment of a device for obtaining an optimum sampling clock. Specifically, device 300 includes an ADC 301 that receives the analog video signals R/G/B. It should be noted that, in other embodiments, analog video signal formats other than R/G/B can be used. The ADC 301 generates digital samples of the analog video signal at a rate determined by the sampling clock (SCLK) provided by sampling clock generator 303.

Sampling clock generator 303 comprises sampling phase controller 3031 and clock generator 3032. Sampling phase controller 3031 provides delaying information corresponding to a predetermined phase difference. Clock generator 3032 generates sampling clocks with a predetermined period according to the horizontal synchronization signal HSYNC and the vertical synchronization signal VSYNC. There is a predetermined phase difference between each sampling clock. The phase difference is determined by sampling phase controller 3031. For example, the phase difference is obtained by dividing the predetermined period into N when there are N sampling clocks.

Figure 5:
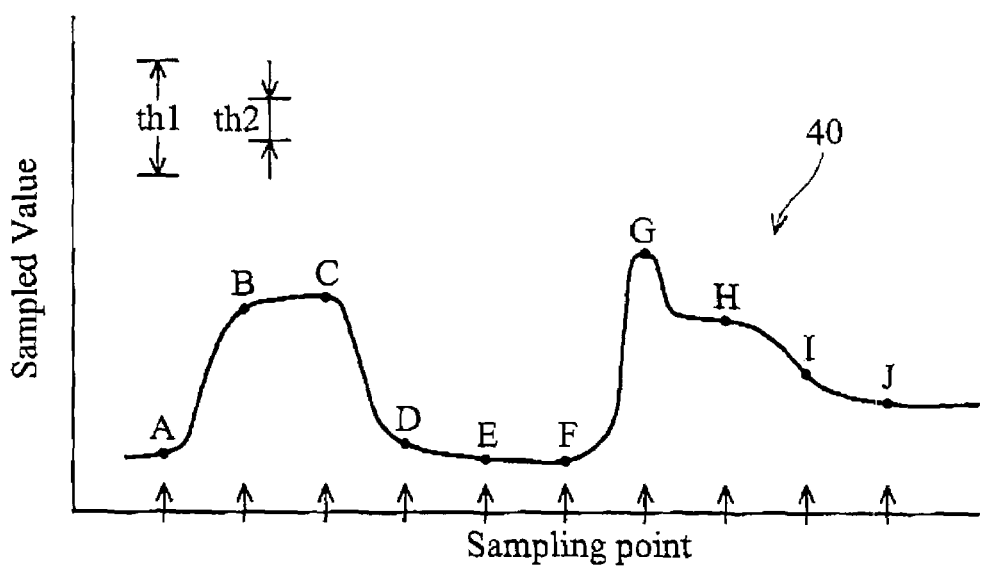
FIG. 5 shows an example of the sampled values of analog video signal of a frame using one sampling clock.

FIG. 5 shows an example of the sampled values of analog video signal 40 of a frame using one sampling clock. Any three sequential sampled values output from ADC 301 are regarded as a sampling group. For example, sampled values A, B and C are a sampling group, sampled values C, D and E are another sampling group, and sampled values E, P and G are one another sampling group.

In this embodiment, the processor detects the edges of the analog video signal 40. An edge of the analog video signal is defined when a difference between the first sampled value and the second sampled value of the sampling group exceeds a first threshold value Th1, and a difference between the second sampled value and the third sampled value of the sampling group is lower than a second threshold value Th2. In addition, the edge of the analog video signal is also defined when a difference between the second sampled value and the third sampled value of the sampling group exceeds the first threshold value Th1, and a difference between the first sampled value and the second sampled value of the sampling group is lower than the second threshold value Th2. Thus, in FIG. 5, the edges formed by sampled values A, B and C, sampled values C, D and E, and sampled values E, F and G are detected. In addition, there is no edge between sampled values G and J according to the threshold values Th1 and Th2.

Processor 305 receives the digital samples generated by the ADC 301, detects the edges formed by the digital samples of the analog video signal, and accumulates the magnitudes of edges within the digital samples of the image signal for each display frame. Using FIG. 5 as an example, processor 305 detects the edges formed by the digital samples A, B and C as well as C, D, and E of the analog video signal 40, and accumulates the differences between sampled values A and B as well as c and D to generate an accumulation value.

Figure 6:
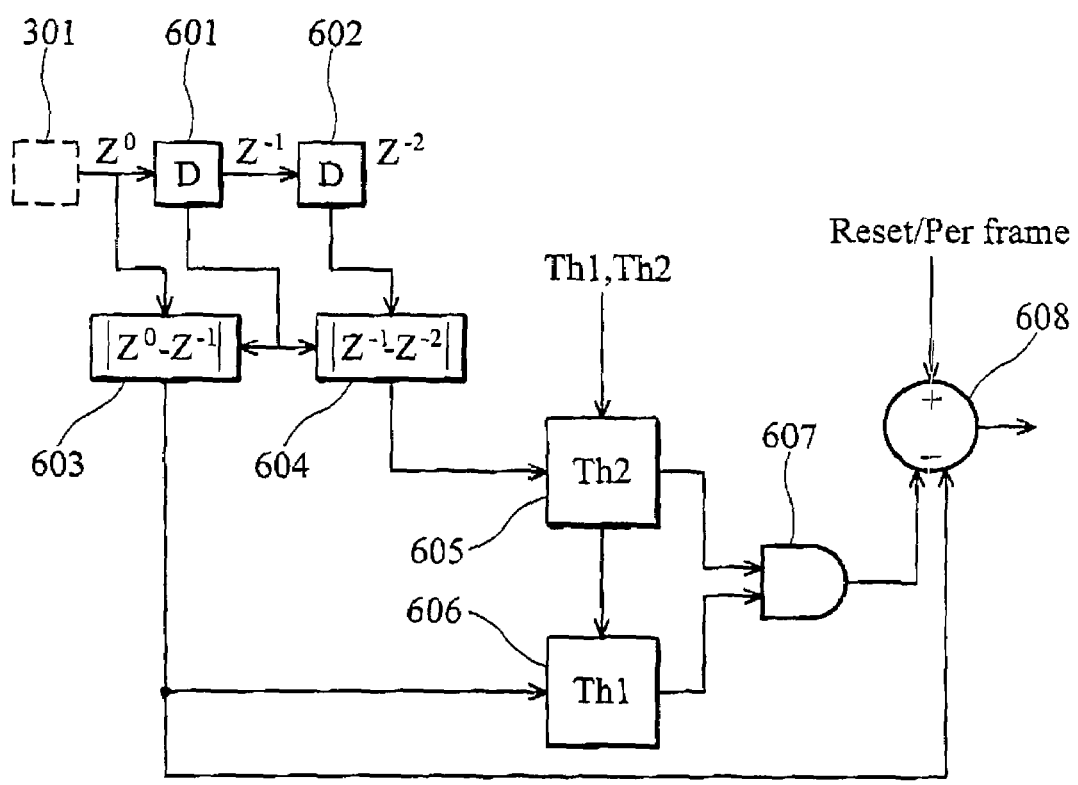
FIG. 6 shows an embodiment of a circuit for obtaining accumulation values.

FIG. 6 shows an embodiment of a circuit for obtaining accumulation values. As shown in FIG. 6, a first latch 601 receives the digital sample $Z^0$ generated by the ADC 301. An output of the first latch 601 is a digital sample $Z^{-1}$ just previous to a present digital sample $Z^0$. A second latch 602 receives the output of the first latch 601. An output of the second latch 602 is a digital sample $Z^{-2}$ twice previous to the present digital sample $Z^0$. A first adder 603 outputs the difference between the digital samples $Z^0$ and $Z^{-1}$ to comparator 606. A second adder 604 outputs the difference between the digital samples $Z^{-1}$ and $Z^{-2}$ to comparator 605. If the output of first adder 603 exceeds the first threshold value Th1 and the output of second adder 604 is lower than the second threshold value Th2, AND gate 607 outputs a high logic signal to trigger accumulator 608 to accumulate the difference between the digital samples $Z^0$ and $Z^{-1}$ of the analog video signal of a frame. The accumulation value is reset to 0 when the analog video signal of the entire frame is sampled. The circuit in FIG. 6 only detects the left edges of the curve formed by the digital samples. However, person in the art can detect the right edges of the curve by changing circuit design.

Figure 7:
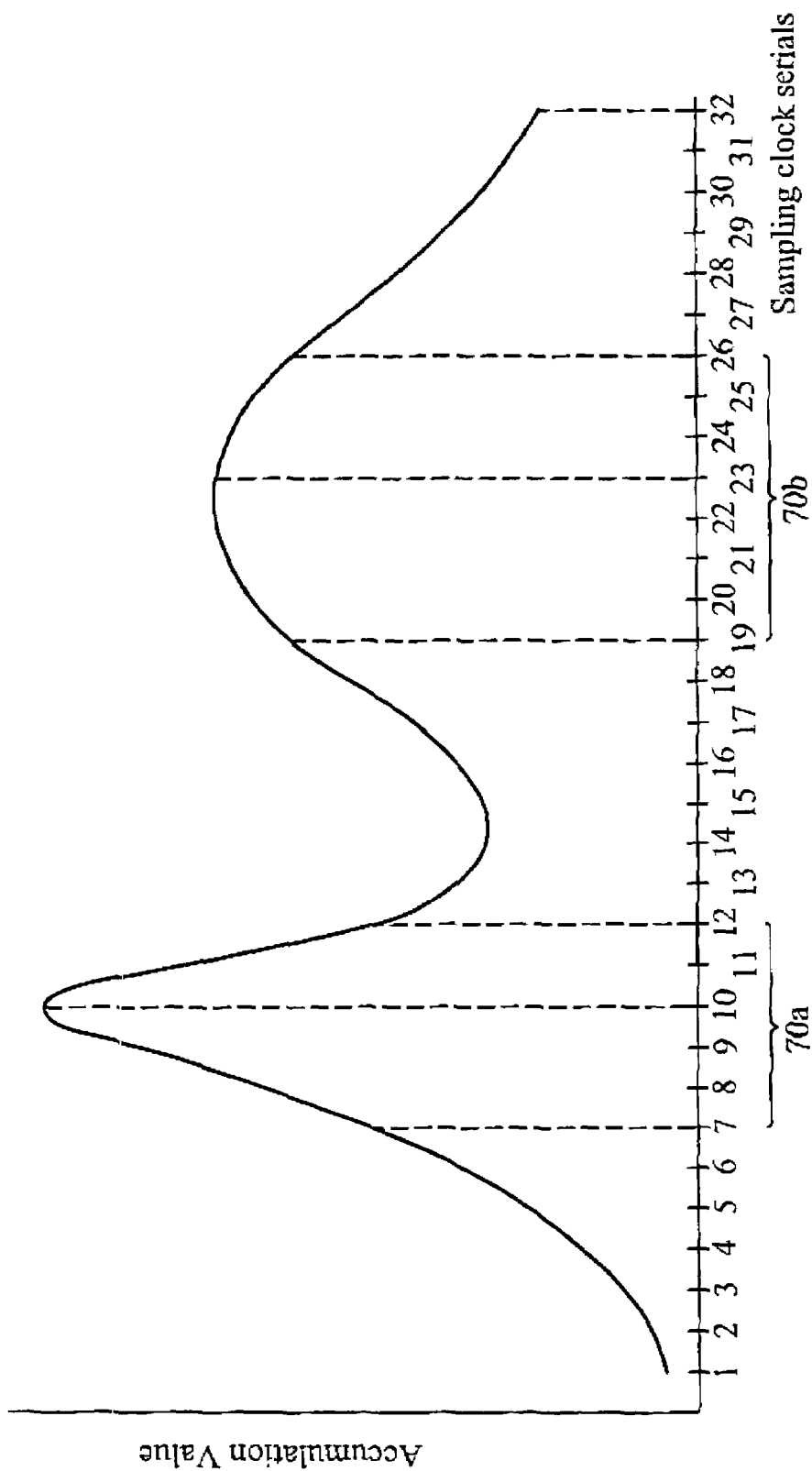
FIG. 7 shows an exemplary relationship between accumulation values and corresponding sampling clocks.

FIG. 7 shows the relationship between the accumulation values and corresponding sampling clocks. As mentioned above, clock generator 3032 generates sampling clocks with a predetermined period and with a predetermined phase difference therebetween. Assuming there are 32 sampling clocks, 32 accumulation values are obtained corresponding to the 32 sampling clocks. Here, the accumulation values corresponding to each sampling clock are arranged in the sequence of the corresponding sampling clocks, and comprise collectively an accumulation value group. For example, the $7^{th}$–$12^{th}$ sampling clocks are in the accumulation value group 70a, and the $19^{th}$–$26^{th}$ sampling clocks are the accumulation value group 70b. The number of accumulation values in an accumulation value group can be random, fixed, or defined by designers.

Processor 305 detects the accumulation value for each sampling clock, and selects one sampling clock as an optimum sampling clock. The optimum sampling clock is determined by selecting the sampling clock corresponding to the largest accumulation value in one accumulation value group when the difference between the accumulation values in the accumulation value group is less than a predetermined range. More specifically, the optimum sampling clock is the sampling clock corresponding to the largest accumulation value when the difference between the accumulation values corresponding to the adjacent sampling clocks is less than a predetermined range.

The accumulation value is obtained by sampling the analog video signal using the $10^{th}$ sampling clock. However, the accumulation values corresponding to the $9^{th}$ and the $11^{th}$ sampling clocks are abruptly decreased, with a large difference between that corresponding to the $10^{th}$ sampling clock. Because there is only slight phase difference among the $9^{th}$, the $10^{th}$ and the $11^{th}$ sampling clocks, the difference among the accumulation values of the corresponding sampling clocks should not exceed the predetermined range. Thus, in this embodiment, the accumulation value corresponding to the $10^{th}$ sampling clock is regarded as being caused by noises or errors, and the $23^{rd}$ sampling clock is selected as an optimum sampling clock for sampling the analog video signal in the following frames. This is because the difference among the accumulation values of $21^{th}$–$25^{th}$ sampling clocks is within the predetermined range.

Thus, the processor 305 outputs a pulse selection signal denoting the sampling phase corresponding the selected optimum sampling clock to the sampling phase controller 3031. Sampling phase controller 3031 provides delaying information corresponding to the pulse selection signal to clock generator 3032. Clock generator 3032 generates the optimum sampling clock according to the delaying information corresponding to the pulse selection signal output by processor 305.

ADC 301 samples the analog video signal R/G/B using the optimum sampling clock, and outputs the digital samples to display processing and panel 307. After obtaining the optimum sampling clock, ADC 301 samples the analog video signal using the optimum sampling clock only. Display processing and panel 307 receives the digital samples of the analog video signal and performs more synchronization and processing of the digital samples before generating a display image according to the horizontal synchronization signal HSYNC and vertical synchronization signal VSYNC.

Figure 8:
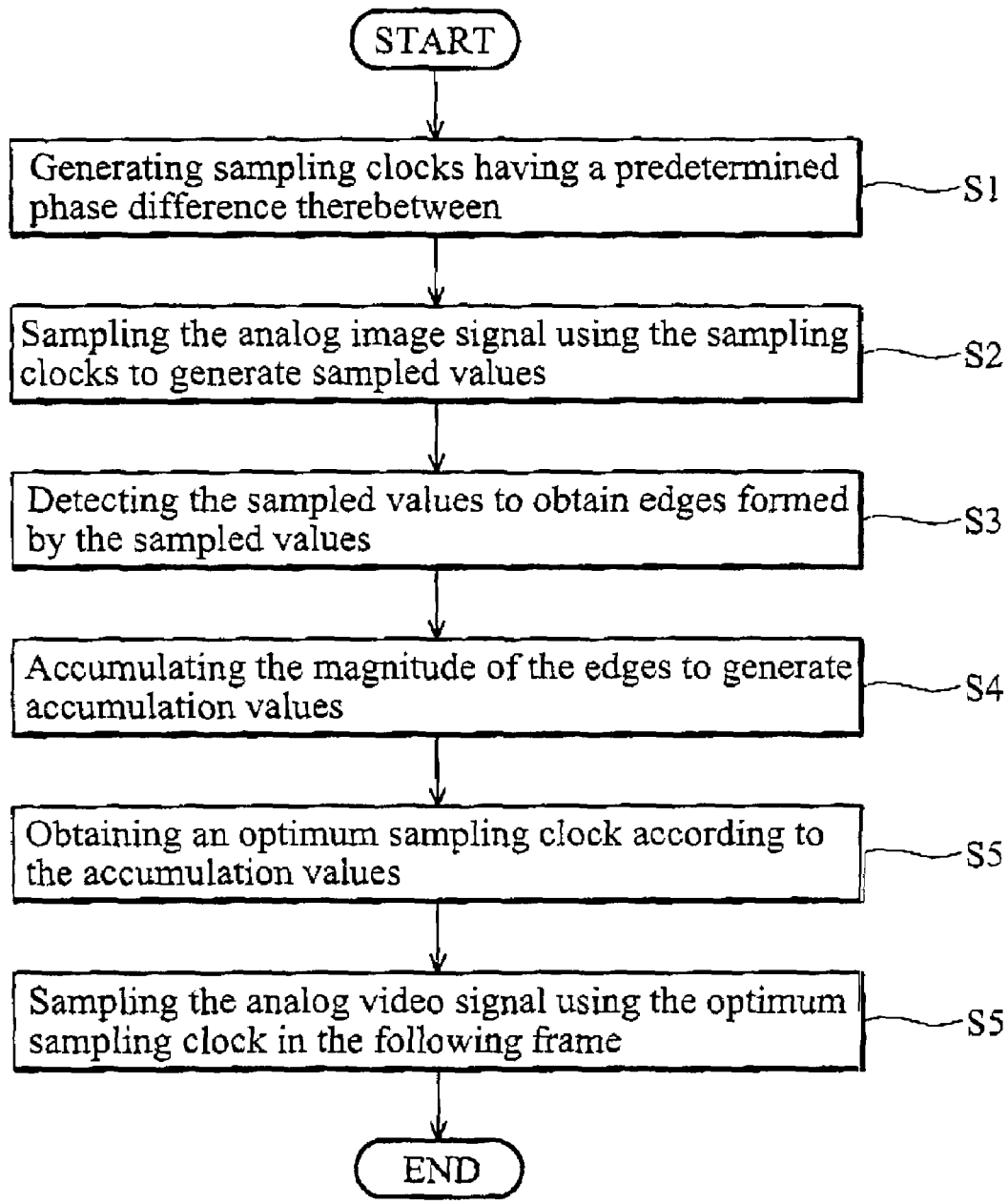
FIG. 8 is a flowchart showing an embodiment of a method for selecting an optimum sampling clock.

FIG. 8 is a flowchart showing an embodiment of a method for selecting an optimum sampling clock. First, sampling clocks having a predetermined phase difference therebetween are sequentially generated according to the horizontal synchronization signal HSYNC and the vertical synchronization signal VSYNC (S1). Next, the analog image signal is sampled at a sampling frequency determined by the sampling clocks in sequence (S2), such that sequential sampled values corresponding to each sampling clock are generated. Here, the sampled values constitute some sampling groups, each sampling group comprising a first sampled level, a second sampled level and a third sampled level in sequence. The sampling groups are the edges in the curve formed by the sampled values. As shown if FIG. 5, sampled values (digital samples) A, B and C form an edge, and the sampled value A is at the first sampled level, sampled value B is at the second sampled level, and sampled value C is at the third sampled level. It is noted that in other embodiments the edge could also be determined by more than three sampled values.

Next, the sampled values are detected to obtain edges formed by the sampled values (S3). Next, the magnitude of the edges are accumulated when the difference between the first sampled level and the second sampled level exceeds a first reference value and the difference between the second sampled level and the third sampled level is less than a second reference value (S4). Thus, an accumulation value belonging to one sampling clock is obtained, since there are a plurality of sampling clock, accumulation values corresponding to the sampling clocks are obtained.

Next, the optimum sampling clock is determined according co the accumulation values (S5). One of the sampling clocks is selected as an optimum sampling clock according to the accumulation values. In some embodiment, the accumulation value corresponding to the optimum sampling clock is the largest one among the accumulation values corresponding to the adjacent sampling clocks. In other words, the accumulation values are regarded as an accumulation value group, which corresponds to the sampling clocks generated in sequence. The accumulation value corresponding to the optimum sampling clock is the largest one in the accumulation value group, and the difference among the accumulation values in the accumulation value group is within a predetermined range. Here, the numbers of accumulation values can be an integral number larger than one. In addition, if there are a plurality of accumulation value groups comprising accumulation values, having difference therebetween all within the predetermined range, the sampling clock corresponding to the largest accumulation value in the accumulation value groups can be set as the optimum sampling clock. In addition, if all the accumulation value groups comprising accumulation values, having difference therebetween all exceed the predetermined range, the sampling clock corresponding to the largest accumulation value can be set as the optimum sampling clock.

Finally, the selected sampling clock is used to sample the analog video signal in the following frame (S6). It is noted that the selection of the optimum sampling clock may process again when the timing information of the analog video signal is changed, for example, when the frequency of the vertical scanning signals and/or the horizontal scanning signals change.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for obtaining a sampling phase to generate image information according to an analog image signal and timing information, the method comprising the steps of:
sequentially generating sampling clocks having a predetermined phase difference therebetween according to the timing information;
sampling the analog image signal using the sampling clocks and generating sequential sampled values corresponding to the sampling clocks;
detecting the sampled values to obtain edges formed by the sampled values;
accumulating the magnitudes of the edges to generate accumulation values;
obtaining an optimum sampling clock according to the accumulation values, wherein the accumulation value corresponding to the optimum sampling clock is the largest one among the accumulation values corresponding to the adjacent sampling clocks, and the difference among the accumulation values corresponding to the adjacent sampling clocks is within a predetermined range; and
sampling the analog image signal using the sampling clock corresponding to the selected accumulation value.

2. The method as claimed in claim 1, wherein each of the edges is formed by three sampled values, and each respectively has a first sampled level, a second sampled level and a third sampled level in sequence.

3. The method as claimed in claim 2, wherein the magnitudes of the edges are accumulated by summing the differences between the first sampled level and the second sampled level of the edges belonging to one sampling clock to obtain the accumulation value when the difference between the first sampled level and the second sampled level exceeds a first reference value and the difference between the second sampled level and the third sampled level is less than a second reference value, or by summing the differences between the second sampled level and the third sampled level of the edges belonging to the sampling clock to obtain the accumulation value when the difference between the second sampled level and the third sampled level exceeds the first reference value and the difference between the first sampled level and the second sampled level is less than the second reference value.

4. The method as claimed in claim 3, further comprising the step of summing the differences between the first sampled level and the second sampled level of the edges belonging to the sampling clock when the difference between the first sampled level and the second sampled level exceeds a first reference value and the difference between the second sampled level and the third sampled level is less than a second reference value, and the differences between the second sampled level and the third sampled level of the edges belonging to the sampling clock when the difference between the second sampled level and the third sampled level exceeds the first reference value and the difference between the first sampled level and the second sampled level is less than the second reference value, to obtain the accumulation value.

5. The method as claimed in claim 1, wherein the image information is obtained by sampling the analog image signal using the optimum sampling clock.

6. The method as claimed in claim 1, wherein the first sampled level exceeds the second sampled level.

7. The method as claimed in claim 1, wherein the second sampled level exceeds the first sampled level.

8. The method as claimed in claim 1, wherein the timing information is vertical scanning signals and horizontal scanning signals provided to a display.

9. A method for obtaining a sampling phase to generate image information according to an analog image signal and timing information, the method comprising the steps of:
sequentially generating sampling clocks having a predetermined phase difference therebetween according to the timing information;
sampling the analog image signal using the sampling clocks and generating sequential sampled values corresponding to each sampling clock, wherein the sampled values comprises a plurality of sampling groups, each sampling group comprising a first sampled level, a second sampled level and a third sampled level in sequence;
detecting the sampled values, accumulating the differences between the first sampled level and the second sampled level of the sampling groups belonging to one sampling clock to obtain a accumulation value when the difference between the first sampled level and the second sampled level exceeds a first reference value and the difference between the second sampled level and the third sampled level is less than a second reference value, or accumulating the differences between the second sampled level and the third sampled level of the sampling groups belonging to the sampling clock to obtain the accumulation value when the difference between the second sampled level and the third sampled level exceeds the first reference value and the difference between the first sampled level and the second sampled level is less than the second reference value;
obtaining the accumulation values corresponding to each sampling clock, the accumulation values arranged in the sequence of the corresponding sampling clocks, comprising collectively an accumulation value group;
detecting the accumulation values, and selecting the largest in the accumulation value group when the difference among the accumulation values in the accumulation value group is less than a predetermined range; and
sampling the analog image signal using the sampling clock corresponding to the selected accumulation value.

10. The method as claimed in claim 9, further comprising the step of accumulating the differences between the first sampled level and the second sampled level of the sampling groups belonging to the sampling clock when the difference between the first sampled level and the second sampled level exceeds a first reference value and the difference between the second sampled level and the third sampled level is less than a second reference value, and the differences between the second sampled level and the third sampled level of the sampling groups belonging to the sampling clock when the difference between the second sampled level and the third sampled level exceeds the first reference value and the difference between the first sampled level and the second sampled level is less than the second reference value, to obtain the accumulation value.

11. The method as claimed in claim 9, wherein the sampling clock corresponding to the selected accumulation value is an optimum sampling clock.

12. The method as claimed in claim 9, further comprising the steps of:
selecting a largest accumulation value when the difference among the accumulation values in all the accumulation value groups all exceed the predetermined range; and
sampling the analog image signal using the sampling clock corresponding to the selected accumulation value.

13. The method as claimed in claim 9, further comprising the steps of:
selecting a largest accumulation value in the accumulation value groups when the difference among the accumulation values in all the accumulation value groups all within the predetermined range; and
sampling the analog image signal using the sampling clock corresponding to the selected accumulation value.

14. The method as claimed in claim 11, wherein the image information is obtained by sampling the analog image signal using the optimum sampling clock.

15. The method as claimed in claim 9, wherein the first sampled level exceeds the second sampled level.

16. The method as claimed in claim 9, wherein the second sampled level exceeds the first sampled level.

17. The method as claimed in claim 9, wherein the timing information is vertical scanning signals and horizontal scanning signals provided to a display.

18. A method for obtaining a sampling phase to generate image information according to an analog image signal and timing information, the method comprising the steps of:
receiving the analog image signal;
sequentially generating a first sampling clock and a second sampling clock having a predetermined phase difference therebetween according to the timing information;
sampling the analog image signal using the first sampling clock and the second sampling clock, and respectively generating sequential first sampled values and second sampled values corresponding to the first sampling clock and the second sampling clock, wherein the first sampled values and second sampled values respectively comprises a plurality of sampling groups, each sampling group comprising a first sampled level, a second sampled level and a third sampled level in sequence;
detecting the first sampled values, accumulating the differences between the first sampled level and the second sampled level of the sampling groups belonging to the first sampled values to obtain a first accumulation value when the difference between the first sampled level and the second sampled level exceeds a first reference value and the difference between the second sampled level and the third sampled level is less than a second reference value, or accumulating the differences between the second sampled level and the third sampled level of the sampling group belonging to the first sampled values to obtain the first accumulation value when the difference between the second sampled level and the third sampled level exceeds the first reference value and the difference between the first sampled level and the second sampled level is less than the second reference value;
detecting the second sampled values, accumulating the differences between the first sampled level and the second sampled level of the sampling groups belonging to the second sampled values to obtain a second accumulation value when the difference between the first sampled level and the second sampled level exceeds the first reference value and the difference between the second sampled level and the third sampled level is less than the second reference value, or accumulating the differences between the second sampled level and the third sampled level of the sampling group belonging to the second sampled values to obtain the second accumulation value when the difference between the second sampled level and the third sampled level exceeds the first reference value and the difference between the first sampled level and the second sampled level is less than the second reference value;
comparing the first accumulation value and the second accumulation value, and selecting the larger one when the difference between the first accumulation value and the second accumulation value is less than a predetermined range; and
sampling the analog image signal using one of the first sampling clock and the second sampling pulse according to the selected accumulation value.

19. The method as claimed in claim 18, further comprising the steps of:
accumulating the differences between the first sampled level and the second sampled level of the sampling groups belonging to the first sampled values when the difference between the first sampled level and the second sampled level exceeds the first reference value and the difference between the second sampled level and the third sampled level is less than the second reference value, and the differences between the second sampled level and the third sampled level of the sampling group belonging to the first sampled values when the difference between the second sampled level and the third sampled level exceeds the first reference value and the difference between the first sampled level and the second sampled level is less than the second reference value, to obtain the first accumulation value; and
accumulating the differences between the first sampled level and the second sampled level of the sampling groups belonging to the second sampled values when the difference between the first sampled level and the second sampled level exceeds the first reference value and the difference between the second sampled level and the third sampled level is less than the second reference value, and the differences between the second sampled level and the third sampled level of the sampling group belonging to the second sampled values when the difference between the second sampled level and the third sampled level exceeds the first reference value and the difference between the first sampled level and the second sampled level is less than the second reference value, to obtain the second accumulation value.

20. The method as claimed in claim 18, wherein the analog image signal is sampled using the first sampling clock when the first accumulation value exceeds the second accumulation value.

21. The method as claimed in claim 18, wherein the analog image signal is sampled using the first sampling clock when the first accumulation value exceeds the second accumulation value.

22. The method as claimed in claim 18, wherein the analog image signal is sampled using the second sampling clock when the second accumulation value exceeds the first accumulation value.

23. The method as claimed in claim 18, further comprising the steps of:
generating a third sampling clock according to the timing information, wherein the predetermined phase difference is between the second sampling clock and the third sampling clock;
sampling the analog image signal using the third sampling clock and the second sampling clock, and generating sequential third sampled values corresponding to the third sampling clock, wherein the third sampled values comprises a plurality of sampling groups, each sampling group comprising the first sampled level, the second sampled level and the third sampled level in sequence;
detecting the third sampled values, accumulating the differences between the first sampled level and the second sampled level of the sampling groups belonging to the third sampled values to obtain a third accumulation value when the difference between the first sampled level and the second sampled level exceeds the first reference value and the difference between the second sampled level and the third sampled level is less than the second reference value, or accumulating the differences between the second sampled level and the third sampled level of the sampling group belonging to the third sampled values to obtain the third accumulation value when the difference between the second sampled level and the third sampled level exceeds the first reference value and the difference between the first sampled level and the second sampled level is less than the second reference value;
comparing the first accumulation value, the second accumulation value and the third accumulation value, and selecting the largest one when the difference among the first accumulation value, the second accumulation value and the third accumulation value is less than the predetermined range; and
sampling the analog image signal using one of the first sampling clock, the second sapling pulse and the third sapling pulse according to the selected accumulation value.

24. The method as claimed in claim 23, further comprising the steps of:
accumulating the differences between the first sampled level and the second sampled level of the sampling groups belonging to the third sampled values when the difference between the first sampled level and the second sampled level exceeds the first reference value and the difference between the second sampled level and the third sampled level is less than the second reference value, and the differences between the second sampled level and the third sampled level of the sampling group belonging to the third sampled values when the difference between the second sampled level and the third sampled level exceeds the first reference value and the difference between the first sampled level and the second sampled level is less than the second reference value, to obtain the third accumulation value.

25. The method as claimed in claim 23, wherein the analog image signal is sampled using the first sampling clock when the first accumulation value exceeds the second accumulation value and the third accumulation value.

26. The method as claimed in claim 23, wherein the analog image signal is sampled using the second sampling clock when the second accumulation value exceeds the first accumulation value and the third accumulation value.

27. The method as claimed in claim 23, wherein the analog image signal is sampled using the third sampling clock when the third accumulation value exceeds the first accumulation value and the second accumulation value.

28. The method as claimed in claim 18, wherein the first sampled level exceeds the second sampled level.

29. The method as claimed in claim 18, wherein the second sampled level exceeds the first sampled level.

30. A device for obtaining a sampling phase to generate image information according to an analog image signal and timing information, comprising:
a sampling clock generator for sequentially generating sampling clocks having a predetermined phase difference therebetween according to the timing information, and selecting one of the sampling clocks to be an optimum sampling clock according to a pulse selection signal;
an analog-to-digital converter for sampling the analog image signal using the sampling clocks and the optimum sampling clock, and generating sequential sampled values and the image information respectively corresponding to each sampling clock and the optimum sampling clock, wherein the sampled values comprises a plurality of sampling groups, each sampling group comprising a first sampled level, a second sampled level and a third sampled level in sequence; and
a processor coupled between the analog-to-digital converter and the sampling clock generator, for implementing the steps of:
detecting the sampled values, accumulating the differences between the first sampled level and the second sampled level of the sampling groups belonging to one sampling clock to obtain a accumulation value when the difference between the first sampled level and the second sampled level exceeds a first reference value and the difference between the second sampled level and the third sampled level is less than a second reference value, or accumulating the differences between the second sampled level and the third sampled level of the sampling groups belonging to the sampling clock to obtain the accumulation value when the difference between the second sampled level and the third sampled level exceeds the first reference value and the difference between the first sampled level and the second sampled level is less than the second reference value;
obtaining the accumulation values corresponding to each sampling clock, the accumulation values arranged in the sequence of the corresponding sampling clocks, comprising collectively an accumulation value group;
detecting the accumulation values;
selecting the largest in the accumulation value group when the difference between the accumulation values in the accumulation value group is less than a predetermined range; and
outputting the pulse selection signal denoting using the sampling clock corresponding to the selected accumulation value as the optimum sampling clock.

31. The device as claimed in claim 30, wherein the processor further implements the step of accumulating the differences between the first sampled level and the second sampled level of the sampling groups belonging to the sampling clock when the difference between the first sampled level and the second sampled level exceeds the first reference value and the difference between the second sampled level and the third sampled level is less than the second reference value, and the differences between the second sampled level and the third sampled level of the sampling groups belonging to the sampling clock when the difference between the second sampled level and the third sampled level exceeds the first reference value and the difference between the first sampled level and the second sampled level is less than the second reference value, to obtain the accumulation value.

32. The device as claimed in claim 30, wherein the processor selects the largest accumulation value and outputs the pulse selection signal denoting using the sampling clock corresponding to the selected accumulation value as the optimum sampling clock when the difference between the accumulation values in all accumulation value groups are all exceeds the predetermined range.

33. The device as claimed in claim 30, wherein the sampling clock generator further comprises:
   a sampling phase controller for providing delaying information corresponding to the predetermined phase difference; and
   a clock generator for generating the sampling clocks having the predetermined phase difference therebetween according to the timing information and the delaying information, and outputting the optimum sampling clock according to the pulse selection signal.

34. The device as claimed in claim 30, wherein the image information is obtained by sampling the analog image signal using the optimum sampling clock.

35. The device as claimed in claim 30, further comprising a display device to display images according to the image information.

36. The device as claimed in claim 30, wherein the first sampled level exceeds the second sampled level.

37. The device as claimed in claim 30, wherein the second sampled level exceeds the first sampled level.

38. The device as claimed in claim 35, wherein the timing information is vertical scanning signals and horizontal scanning signals provided to the display device.

* * * * *